United States Patent
Turin et al.

(10) Patent No.: US 10,541,455 B2
(45) Date of Patent: Jan. 21, 2020

(54) PROCESS FOR MANUFACTURING AN ELEMENTARY GAS-ELECTRODE ELECTROCHEMICAL CELL OF THE METAL-GAS TYPE AND ASSOCIATED CELL

(71) Applicant: COMMISSARIAT A L'ENERGIE ATOMIQUE ET AUX ENERGIES ALTERNATIVES, Paris (FR)

(72) Inventors: Guillaume Turin, Lille (FR); Philippe Azais, Saint Egreve (FR); Yves Berthe De Pommery, Grenoble (FR); Lionel Picard, Seyssinet-Pariset (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 256 days.

(21) Appl. No.: 15/123,193

(22) PCT Filed: Mar. 2, 2015

(86) PCT No.: PCT/EP2015/054286
§ 371 (c)(1),
(2) Date: Sep. 1, 2016

(87) PCT Pub. No.: WO2015/132193
PCT Pub. Date: Sep. 11, 2015

(65) Prior Publication Data
US 2017/0062887 A1    Mar. 2, 2017

(30) Foreign Application Priority Data
Mar. 4, 2014    (FR) ...................... 14 51744

(51) Int. Cl.
*H01M 12/06*    (2006.01)
*H01M 4/13*    (2010.01)
(Continued)

(52) U.S. Cl.
CPC ........... *H01M 12/06* (2013.01); *H01M 4/134* (2013.01); *H01M 4/382* (2013.01)

(58) Field of Classification Search
None
See application file for complete search history.

(56) References Cited

U.S. PATENT DOCUMENTS

| 3,451,853 A | | 6/1969 | Spahrbier | |
| 4,209,575 A | * | 6/1980 | McDowall | H01M 2/18 |
| | | | | 429/146 |

(Continued)

FOREIGN PATENT DOCUMENTS

| AT | 268408 | 2/1969 |
| EP | 0 948 072 A1 | 10/1999 |

(Continued)

OTHER PUBLICATIONS

French Search Report dated Nov. 26, 2014 in FR1451744 Filed Mar. 4, 2014.

(Continued)

*Primary Examiner* — Scott J. Chmielecki
(74) *Attorney, Agent, or Firm* — Oblon, McClelland, Maier & Neustadt, L.L.P.

(57) ABSTRACT

A process for manufacturing an elementary gas electrode electrochemical cell of metal-gas type, configured to be integrated into an electrochemical assembly module of a system for storing energy and including: an electrochemical core including at least one negative electrode and at least one positive electrode, at least one negative electrode as a gas electrode and at least one positive electrode as a metal electrode or vice versa, the process including: producing the electrochemical core of the cell by winding, folding, and/or stacking a plurality of layers including at least one negative-electrode layer, one positive-electrode layer, and one electrolyte layer, and forming gas flow spaces channeling the gas to the one or more gas electrode layers.

29 Claims, 6 Drawing Sheets

(51) Int. Cl.
*H01M 4/38* (2006.01)
*H01M 4/134* (2010.01)

(56) References Cited

U.S. PATENT DOCUMENTS

| | | | |
|---|---|---|---|
| 4,567,119 A | 1/1986 | Lim | |
| 6,287,721 B1 | 9/2001 | Xie et al. | |
| 6,500,575 B1* | 12/2002 | Shiue | H01M 10/48 29/623.1 |
| 8,440,356 B2 | 5/2013 | Kim | |
| 8,871,394 B1* | 10/2014 | Garcia | H01M 10/0422 429/403 |
| 2005/0260493 A1 | 11/2005 | Frederiksson et al. | |
| 2010/0285375 A1* | 11/2010 | Friesen | H01M 12/06 429/405 |
| 2011/0003213 A1* | 1/2011 | Burchardt | H01M 8/0239 429/402 |
| 2011/0200891 A1* | 8/2011 | Kotani | H01M 4/382 429/403 |
| 2012/0208102 A1* | 8/2012 | Schumm, Jr. | H01M 8/04089 429/444 |
| 2013/0000110 A1 | 1/2013 | Takeda et al. | |
| 2014/0199588 A1* | 7/2014 | Shinozaki | C25D 1/04 429/211 |
| 2014/0342194 A1* | 11/2014 | Wang | H01M 2/30 429/50 |
| 2015/0140452 A1* | 5/2015 | Park | H01M 12/06 429/403 |
| 2015/0162653 A1* | 6/2015 | Ootani | H01M 4/12 429/404 |

FOREIGN PATENT DOCUMENTS

| | | |
|---|---|---|
| EP | 1 049 189 A1 | 11/2000 |
| EP | 1 650 819 A1 | 4/2006 |
| EP | 2 378 595 A2 | 10/2011 |
| WO | 85/04287 A1 | 9/1985 |

OTHER PUBLICATIONS

International Search Report dated Apr. 17, 2015 in PCT/EP2015/054286 Filed Mar. 2, 2015.

* cited by examiner

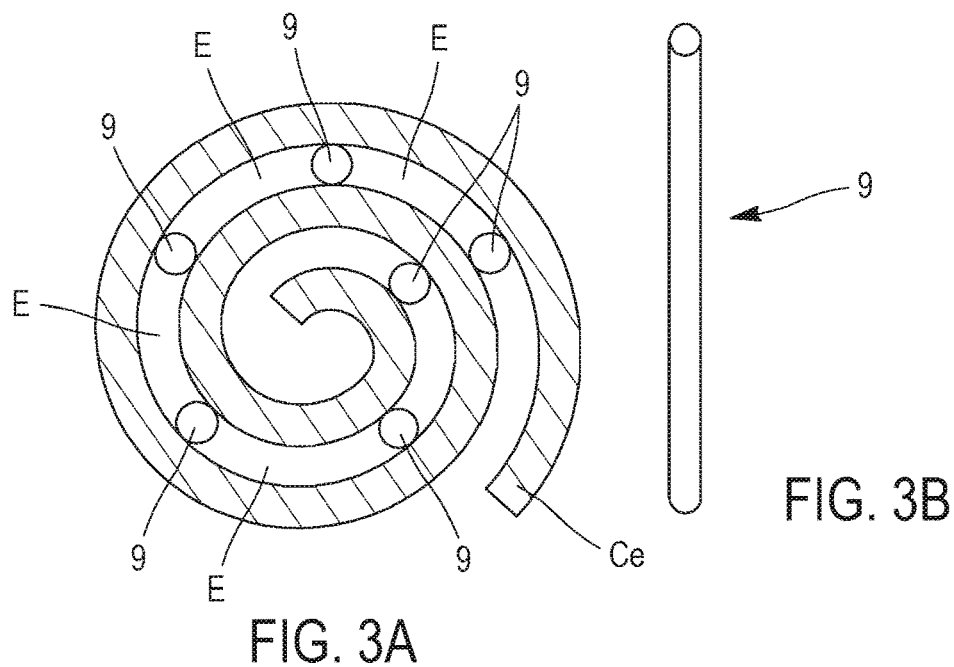
FIG. 3A
FIG. 3B
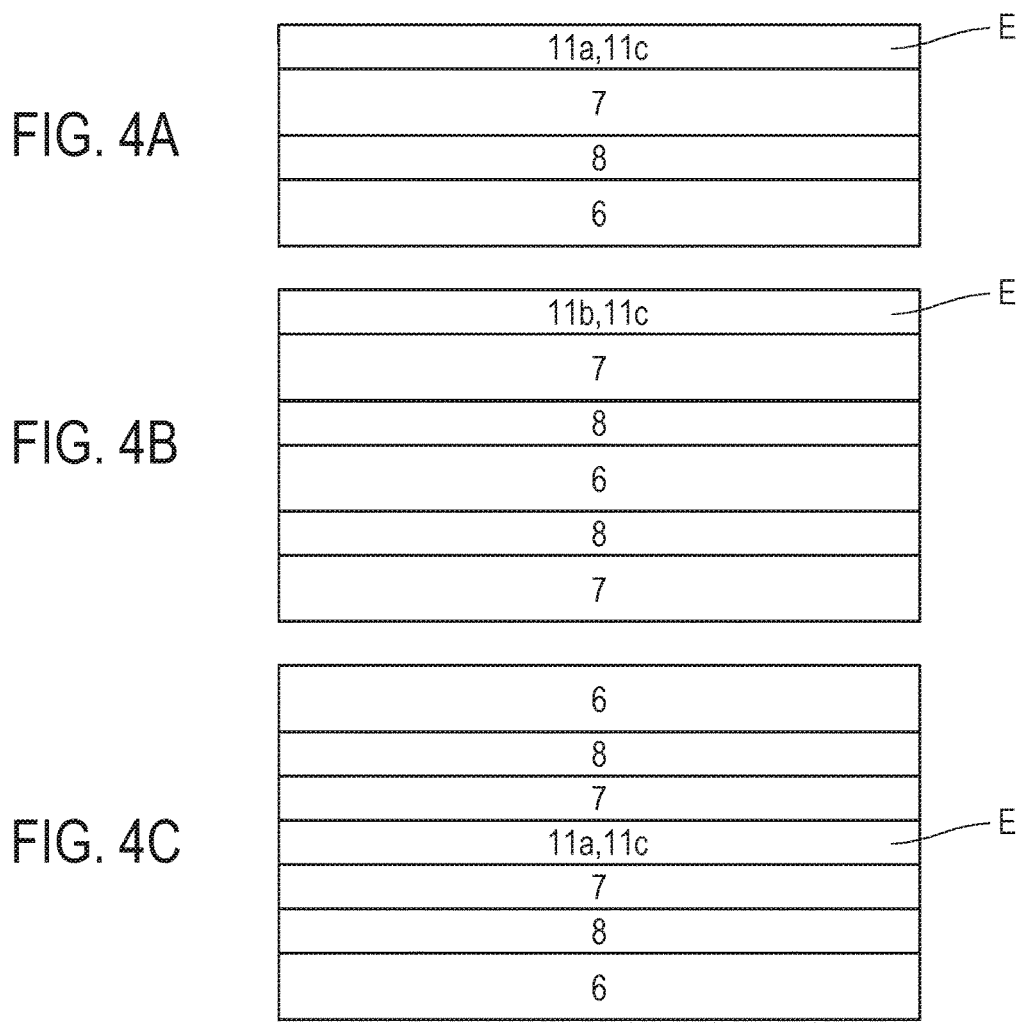
FIG. 4A
FIG. 4B
FIG. 4C

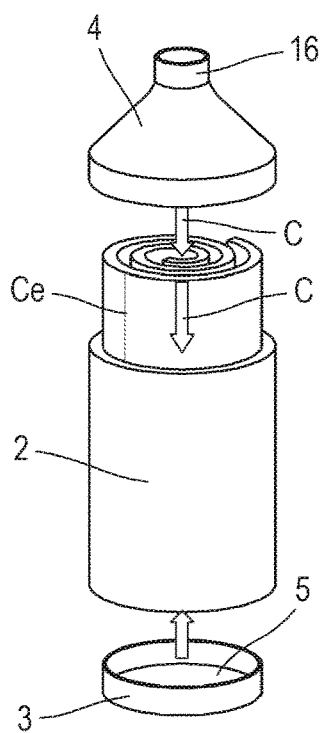
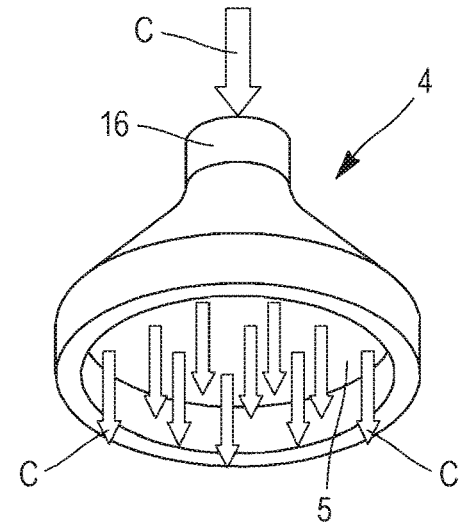
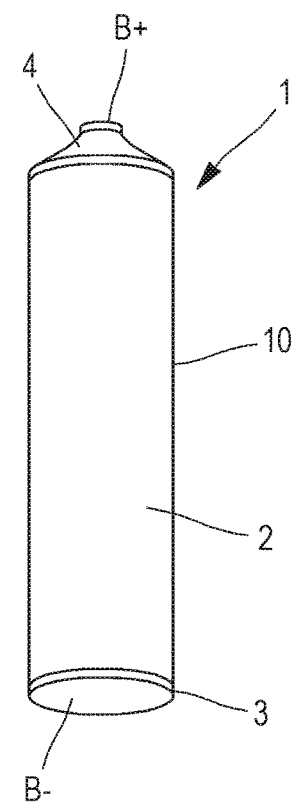
FIG. 9A
FIG. 9B
FIG. 9C
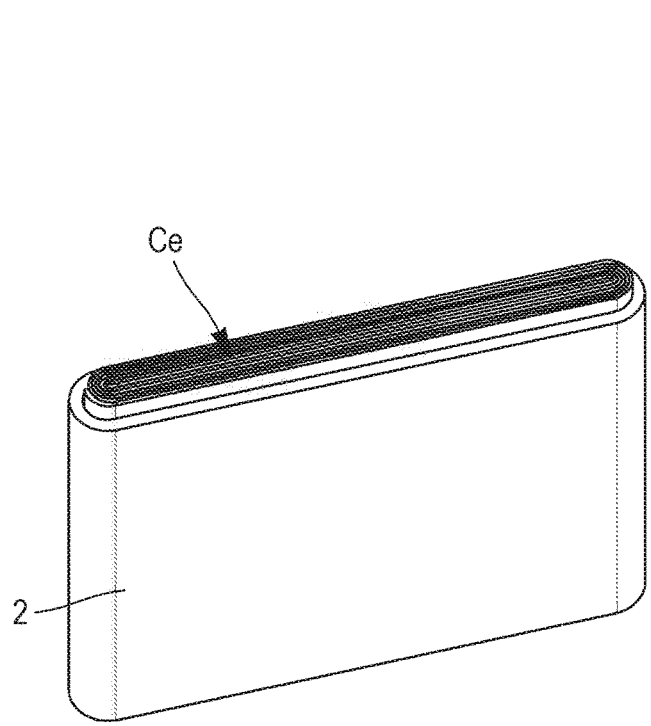
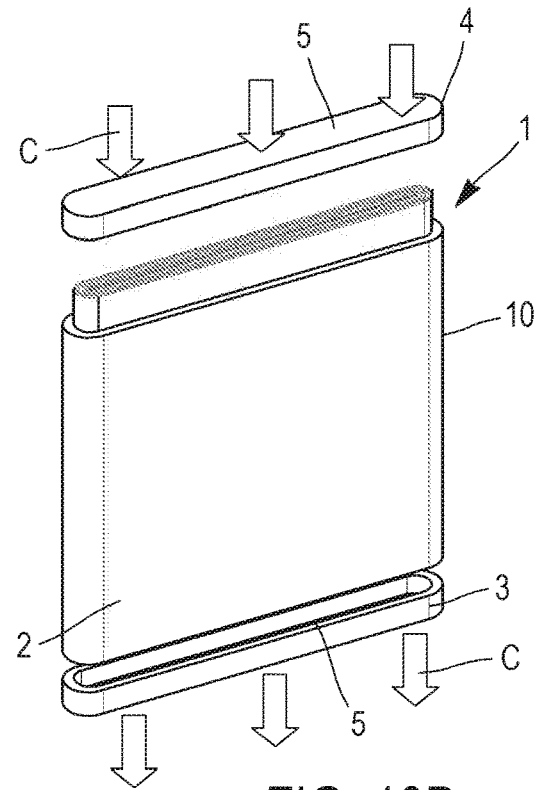
FIG. 10A
FIG. 10B

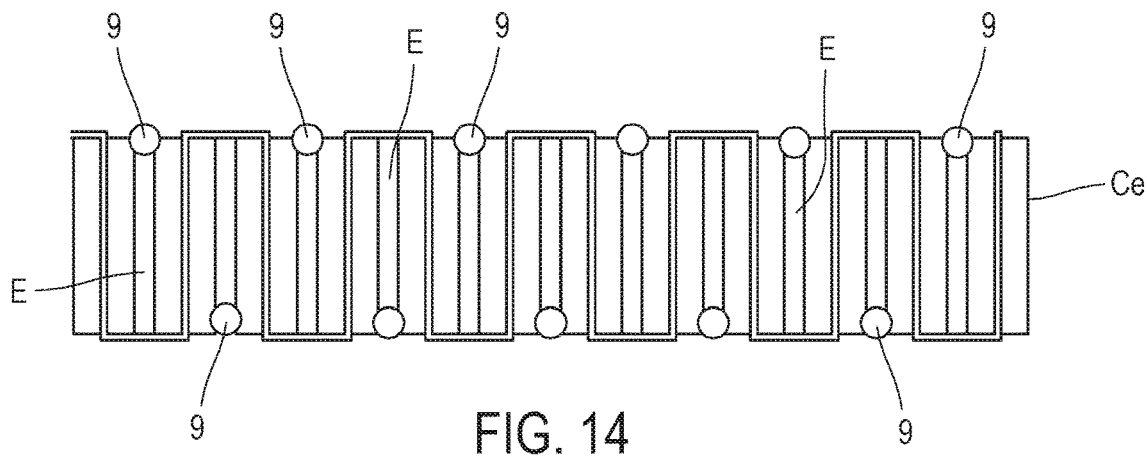
FIG. 14
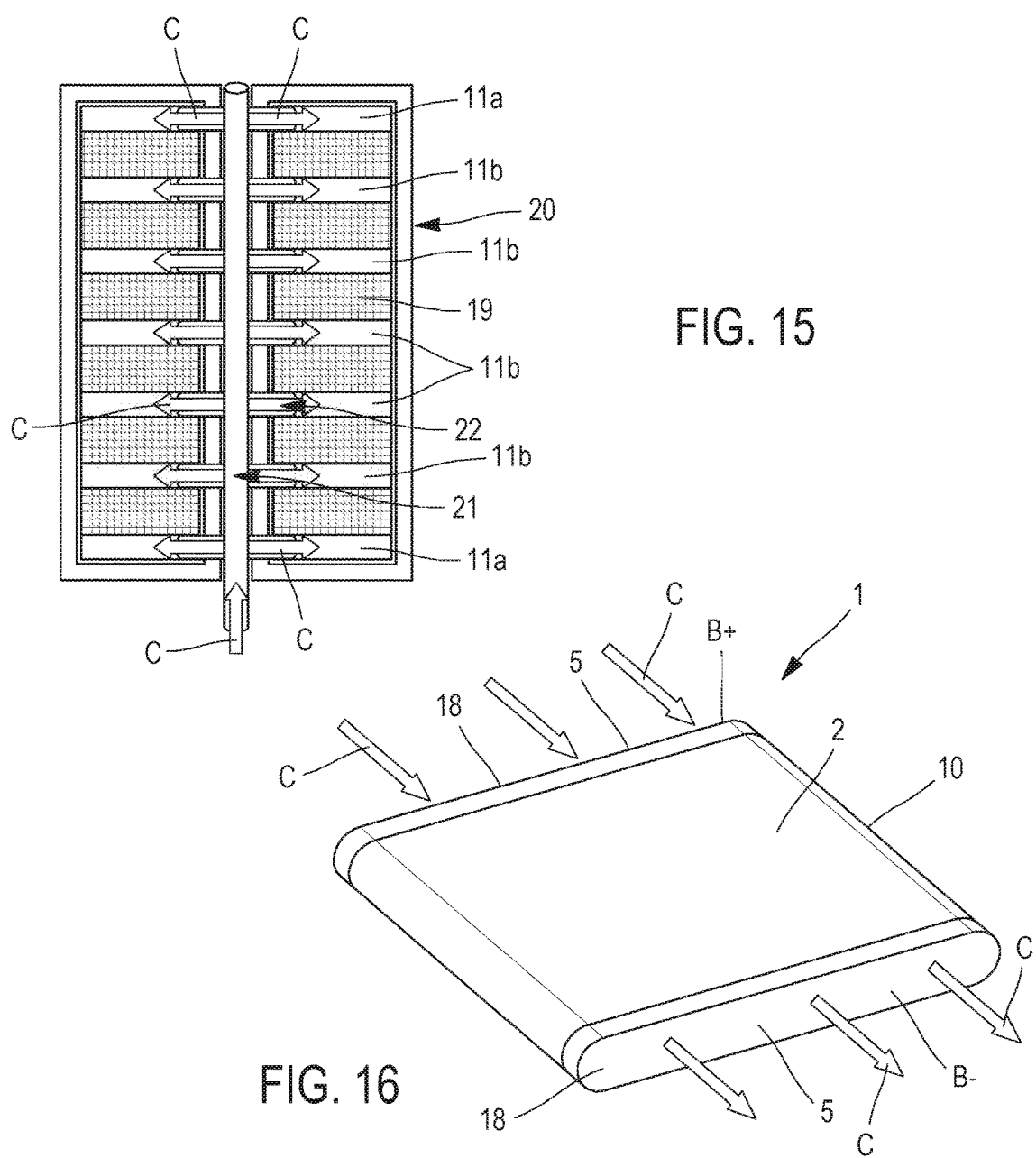
FIG. 15
FIG. 16

PROCESS FOR MANUFACTURING AN ELEMENTARY GAS-ELECTRODE ELECTROCHEMICAL CELL OF THE METAL-GAS TYPE AND ASSOCIATED CELL

TECHNICAL FIELD

The present invention relates to the field of electrical-energy storage cells, and in particular to the field of elementary electrochemical cells. Such cells are intended are intended to be assembled in modules and self-assembled together in order to form an energy-storage system, for example a battery pack. More particularly, the invention concerns the field of electrochemical cells comprising a gas electrode, and more specifically the field of electrochemical cells of the metal-gas type.

It finds applications in many fields in industry, in particular for stationary or on-board applications, especially for the field of the electrical supply of land, air and/or nautical transport vehicles, for example for the electrical supply of hybrid and/or electric vehicles for which an arrangement of a large number of electrical energy storage cells is required.

Among elementary electrochemical cells, three main types of architecture geometry are normally used. Thus, conventionally and as known per se, the cells may have a cylindrical geometry, a prismatic geometry or a pouch/stack geometry (also referred to as "pouch-cell").

Preferentially, the invention applies to electrical storage cells with prismatic and/or cylindrical geometry, although it may also relate to other types of cell geometry.

The invention thus proposes a method for manufacturing an elementary gas-electrode electrochemical cell of the metal-gas type, and an elementary electrochemical cell obtained from such a method.

PRIOR ART

Accumulators are systems for storing electrical energy in chemical form. They are based on a reversible, that is to say rechargeable, electrochemical system. However, all the proposals listed below remain valid for primary (non-rechargeable) systems, such as for example aluminium-air, or zinc-air, unless mentioned to the contrary.

The energy storage system is an assembly of electrochemical modules, themselves assemblies of elementary electrochemical cells that constitute accumulators. In the energy storage system, the electrochemical cells are connected and managed by control electronics, also referred to as BMS electronics, standing for "battery management system", which makes it possible to optimise charging and discharging and to prolong the service life.

The accumulators or cells contain chemical reagents which, once activated, make it possible to supply electricity on demand. These electrochemical reactions are activated in the elementary electrochemical cell, between a positive electrode and a negative electrode immersed in an electrolyte, when an electrical charge is connected to the terminals of the cell. By way of example, Li-ion technology consists of using the electrochemical circulation of the lithium ion in two materials and at different potentials: the positive electrode and the negative electrode constitute the two oxidation-reduction potentials, and the difference in potential creates the voltage in the battery. In the course of use (the accumulator discharges), the negative electrode releases lithium in $Li^+$ ionic form. The $Li^+$ ions then migrate towards the positive electrode, via the ionic conductive electrolyte. The passage of each $Li^+$ ion in the accumulator is compensated for by the passage of an electron in the external circuit (current flowing from the terminals of the accumulator) in the opposite direction, thus creating the electric current enabling the device associated with the battery to function. There is then electric current until there is no longer any lithium in the negative electrode: the accumulator is then discharged and is recharged in the reverse process.

Elementary electrochemical cells of the Li-ion type are very widespread in numerous applications, mainly in mobile telephony and roaming computing. Several cell formats or geometries currently exist, and mainly cells with a cylindrical geometry (the electrochemical core is then produced by winding a double positive electrode, an electrolyte and a double negative electrode placed one above the other) and prismatic-geometry cells (the electrodes and electrolyte of the electrochemical core then being able to be wound, stacked or folded, for example in a Z). The patent applications EP 1 650 819 A1 and EP 1 049 189 A1 describe for example cells comprising a wound electrochemical core and similar to the so-called 18650 type cylindrical Li-ion batteries. The patent applications EP 2 378 595 A1 and EP 0 948 072 A1 also describe cells of the Li-ion type but with a prismatic geometry. The electrochemical core of prismatic-geometry cells may also be discontinuous (also referred to as sequenced or "patterned"), or even stacked, or again folded, for example in a Z. Such examples of stacked or folded electrochemical cores are for example described in the U.S. Pat. No. 8,440,356 B2 and U.S. Pat. No. 6,287,721 B1 or the patent application US 2013/0000110 A1.

Moreover, among the various possibilities existing for the choice of the electrodes of elementary electrochemical cells, electrochemical cells are known that comprise a gas electrode, also referred to hereinafter as "gas-electrode cells", and in particular the cells of the so-called metal-gas type, that is to say cells that comprise at least one metal electrode at one pole and at least one gas electrode at the other pole, separated by an electrolyte. The present invention relates particularly to this type of elementary electrochemical cell, and in particular the cells of the so-called lithium-oxygen or Li-air type.

This is because current studies show the advantage of metal-gas technology, and in particular Li-air, for elementary electrochemical cells, which could constitute a substitute for Li-ion technology.

Nevertheless, metal-gas technology, and in particular Li-air, is different in its functioning from Li-ion technology, and gives rise to various inherent constraints, in particular in terms of architecture of the cells and, by extension, in terms of manufacture, and in particular with regard to the protection of the lithium of the electrolyte and good circulation of the gas. This is because optimisation of the circulation of the gas to allow optimum arrival of the gas at the gas electrodes is a fundamental problem for improving the efficiency of batteries of the metal-gas type, in terms of reaction kinetics, whatever the envisaged application of such batteries.

DISCLOSURE OF THE INVENTION

There thus exists a need to design a novel solution for producing elementary electrochemical cells of the metal-gas type, and in particular cells of the Li-air type.

The aim of the invention is to at least partially remedy the requirements mentioned above and the drawbacks relating to the implementations of the prior art.

The invention aims in particular to propose a solution for producing elementary electrochemical cells of the metal-gas type, and in particular of the Li-air type, which are wound, stacked or folded, and with a cylindrical or prismatic architecture geometry.

The subject matter of the invention is thus, according to one of its aspects, a method for manufacturing an elementary gas-electrode electrochemical cell of the metal-gas type, intended to be integrated in an electrochemical assembly module of an energy storage system, provided with an electrochemical core comprising at least one negative electrode and at least one positive electrode, at least one negative electrode being a gas electrode and at least one positive electrode being a metal electrode or vice versa, characterised in that it comprises the step consisting of producing the electrochemical core of the cell by winding, folding and/or stacking of several layers, including at least one negative electrode layer, a positive electrode layer and an electrolyte layer, and forming spaces for circulation of the gas for conveying the gas to the gas-electrode layer or layers.

By virtue of the invention, it is possible to produce elementary electrochemical cells of the metal-gas type, and in particular of the Li-air type, the architecture and principle of obtaining of which are advantageously similar to those of elementary electrochemical cells currently manufactured and used, and in particular cells of the Li-ion type, so as to afford rapid, easy and inexpensive adaptability and transition for optional change from one technology to another. Moreover, the invention can allow the design of elementary electrochemical cells of the metal-gas type, and in particular Li-air, while providing good circulation of gas with dimensions similar to those currently existing for elementary electrochemical cells of the Li-ion type.

The method according to the invention may further comprise one or more of the following features taken in isolation or in accordance with all possible technical combinations.

The elementary electrochemical cell may preferentially be of the lithium-air type, or of the aluminium-air or zinc-air type.

The gas circulation spaces may be formed by separations generated between the windings, foldings and/or stacks of the electrochemical core of the cell.

The method may comprise the step of manufacturing an elementary electrochemical cell of cylindrical or prismatic architecture geometry with the production of an electrochemical core by winding.

The electrochemical core may be produced by the successive superimposition of the following layers:
- a metal negative electrode layer, consisting in particular of a sheet of copper and a sheet of metal lithium covered with a protective membrane,
- a layer of electrolyte, consisting in particular of a layer of separator soaked in electrolyte,
- a positive gas electrode layer, consisting in particular of a grille of nickel covered with a layer of the GDL type promoting the diffusion of gas evenly on the surface of the positive electrode.

The electrochemical core can be produced by the successive superimposition, on either side of a metal negative electrode layer, consisting in particular of a sheet of copper and a sheet of metal lithium covered with a protective membrane, of an assembly formed by a layer of electrolyte, consisting in particular of a layer of separator soaked in electrolyte, and a positive gas electrode layer, consisting in particular of a nickel grille covered with a layer of the GDL type promoting the diffusion of the gas evenly on the surface of the positive electrode.

The electrochemical core can be produced by the successive superimposition, on either side of a positive gas electrode layer, consisting in particular of a nickel grille covered with a layer of the GDL type promoting the diffusion of gas evenly on the surface of the positive electrode, of an assembly formed by an electrolyte layer, consisting in particular of a layer of separator soaked in electrolyte, and a metal negative electrode layer consisting in particular of a sheet of copper and a sheet of metal lithium covered with a protective membrane.

The method may further comprise the step consisting of disposing separation means on the surface of at least one positive or negative electrode layer, in particular a gas electrode layer, during the winding of the layers to form the wound electrochemical core, so as to form gas circulation spaces for conveying gas to the gas electrode layer or layers.

The method may comprise the step consisting of disposing, on the surface of one or more gas electrode layers, struts spaced apart from each other in order to form gas circulation spaces.

The method may comprise the step consisting of disposing, on the surface of one or more gas electrode layers, at least one flexible gas diffusion layer for forming gas circulation spaces.

Said at least one flexible gas diffusion layer may be a porous flexible foam.

Said at least one flexible gas diffusion layer may be a flexible gas diffusion plate, in particular a single-pole plate or a twin-pole plate.

The method may comprise the step consisting of placing, on the surface of one or more gas electrode layers, an element for shaping during the winding of the wound electrochemical core, corresponding in particular to one or more struts, preforms, single-pole or twin-pole plates or thickness elements, and the step consisting of removing the forming element to leave clear one or more gas circulation spaces between the layers of the wound electrochemical core.

The separation means may be produced from an insulating material.

The separation means may in a variant be produced from a conductive material.

The method may comprise the step consisting disposing conductive wires, in particular metal, on the surface of each of the positive and negative electrode layers, and connecting them together (respectively the wires on the surface of the positive electrode layers together and the wires on the surface of the negative electrodes together), in particular by welding.

The winding of the electrochemical core can be carried out by winding the electrochemical core around a winding element, in particular a mandrel.

The cell may have a cylindrical architecture geometry, and the radius $\rho$ of the winding element may be obtained by the following equation:

$$\rho = [D - (e+f) \times (n-1)]/2,$$

where:
D is the outside diameter of the cell,
e is the thickness of the electrochemical core,
f is the thickness of the space between two windings, and
n is the number of half-windings of the electrochemical core.

The layers of the electrochemical core, after sizing thereof, may be cut, then fixed to the winding element, then wound around the winding element in order to form the wound electrochemical core of the cell.

The cell may have a prismatic architecture geometry, and may be sequenced by the presence of an electrochemical core formed by a succession of electrochemical core patterns distributed over a current-collector strip.

The method may comprise the step of manufacturing an elementary electrochemical cell with a prismatic architecture geometry with the production of an electrochemical core by folding in a Z.

The cell may be sequenced by the presence of an electrochemical core formed by a succession of electrochemical core patterns distributed over a current-collector strip. The strip may be folded in a Z in order to form the cell, separation means, in particular struts, being disposed at each fold in order to form one or more gas circulation spaces.

The method may comprise the step of manufacturing an elementary electrochemical cell with prismatic architecture geometry with the production of an electrochemical core by stacking.

Furthermore, another subject matter of the invention, according to another of its aspects, is an elementary gas-electrode electrochemical cell of the metal-gas type, intended to be integrated in an electrochemical assembly module of an energy storage system, characterised in that it is obtained by implementing the manufacturing method as previously defined.

The cell may be of the lithium-air type.

The cell may have a cylindrical or prismatic architecture geometry, comprising a wound electrochemical core.

The cell may comprise a housing, comprising a tube with a cylindrical or prismatic cross section, a bottom cover and a top cover, each cover constituting a terminal connected to an electrical pole of the electrochemical core of the cell.

The bottom and top covers may comprise an opening for the circulation of gas.

The cell may comprise separation means between the internal part of the tube of the housing and the electrochemical core of the cell in order to form gas circulation spaces.

The cell may have a prismatic architecture geometry, comprising an electrochemical core folded in a Z or stacked.

The cell may comprise a housing, comprising an insulating body and two conductive lateral covers.

The insulating body may comprise orifices or grilles on two of its opposite sides that allow a gas to pass.

The features stated in the present description may be taken in isolation or in all technically possible combinations with other features.

BRIEF DESCRIPTION OF THE DRAWINGS

The invention can be understood better from a reading of the following detailed description of non-limitative example embodiments thereof, as well as from an examination of the schematic partial figures of the accompanying drawing, in which:

FIG. 3A depicts, in cross section, the winding of an elementary electrochemical cell with a cylindrical architecture geometry with the presence of struts for forming gas circulation spaces, FIG. 3B depicts, in perspective, an example of a strut used for forming gas circulation spaces in an elementary electrochemical cell, FIGS. 4A, 4B and 4C illustrate the possibility of disposing, on a gas electrode layer or between two gas electrode layers of the electrochemical core of an elementary electrochemical cell according to the invention, a flexible gas diffusion layer intended for forming a gas circulation space, respectively for the possibilities of superimposing layers of an elementary electrochemical cell of FIGS. 2A, 2B and 2C, FIGS. 9A, 9B and 9C depict, in perspective, an example of an elementary electrochemical cell comprising a housing provided with a top cover provided with a hermetic gas connecting piece, FIGS. 10A and 10B depict, in perspective and respectively in partial and non-assembled view, an example of an elementary electrochemical cell with a prismatic architecture geometry and with a wound electrochemical core, obtained by the manufacturing method according to the invention, FIG. 14 illustrates, in cross section, the possibility of having separation means in the form of struts on the electrochemical core of an elementary electrochemical cell with a prismatic architecture geometry and with an electrochemical core folded in a Z, FIG. 15 depicts, in front view, a diagram of packing in modules of elementary electrochemical cells with prismatic architecture geometry and with an electrochemical core folded in a Z, with a pressurised gas circulation, and FIG. 16 depicts, in perspective, an example of an elementary electrochemical cell with prismatic architecture geometry and comprising a stacked electrochemical core, in an assembled configuration of the cell.

In all these figures, identical references may designate identical or similar elements.

In addition, the various parts depicted in the figures are not necessarily depicted to a uniform scale, in order to make the figures more legible.

DETAILED DISCLOSURE OF PARTICULAR EMBODIMENTS

In all the examples described below, the electrical energy storage cells 1 are elementary electrochemical cells 1, intended to form intended to form electrochemical generators. In addition, each elementary electrochemical cell 1 comprises an electrochemical core, comprising at least one negative electrode, at least one positive electrode and at least one electrolyte between a negative electrode and a positive electrode, so as to an electrochemical reaction to take place.

Furthermore, the elementary electrochemical cells 1 presented here preferentially have a prismatic or cylindrical geometry. They are in particular intentionally integrated in an electrochemical assembly module of an energy storage system.

Different variants of the method for manufacturing an elementary electrochemical cell 1 of the metal-gas type according to the invention, and in particular a cell of the Li-air type, are presented below.
Manufacture by Cylindrical Winding The production of an elementary electrochemical cell 1 of the metal-gas type, with a cylindrical architecture geometry and with a wound electrochemical core, is described below.

Figures 1A, 1B:
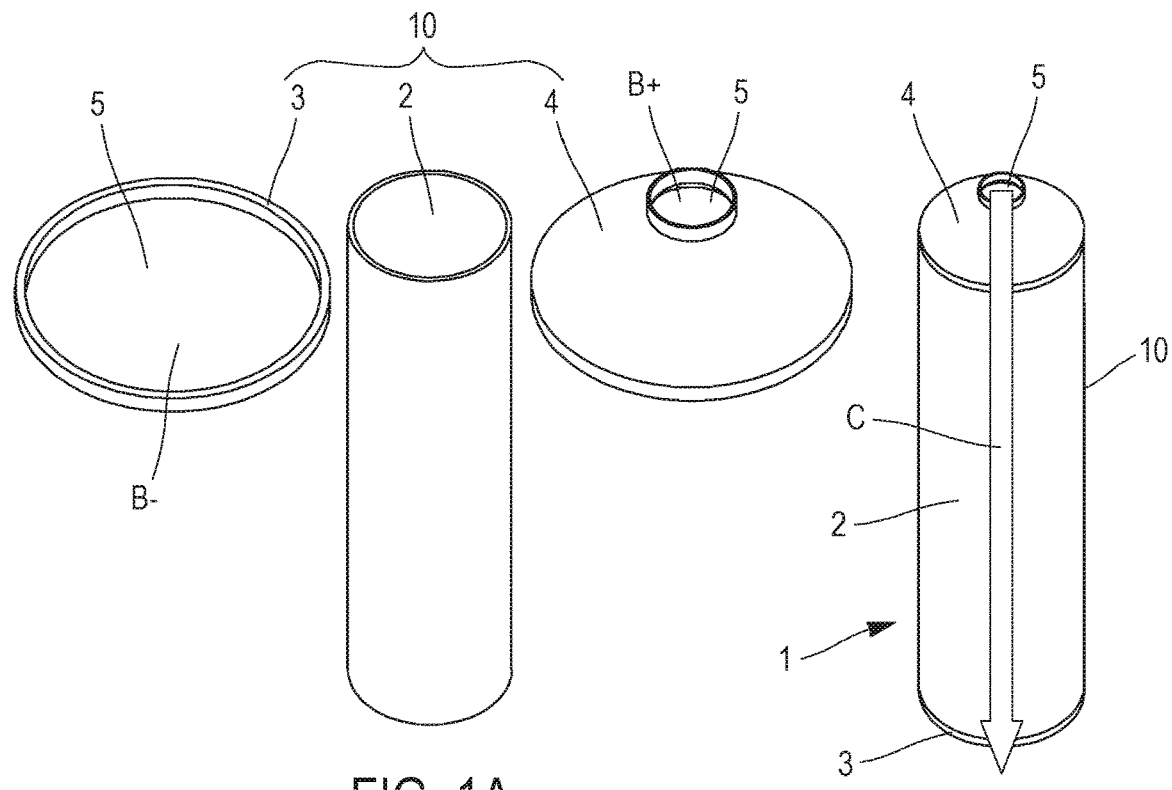
FIGS. 1A and 1B depict, in perspective and respectively in non-assembled view and assembled view, an example of an elementary electrochemical cell of the metal-gas type with cylindrical architecture geometry and having a wound electrochemical core, the cell being obtained by the method according to the invention.

FIGS. 1A and 1B also show, in perspective and respectively in a non-assembled view and an assembled view, an example of such a cell 1 with cylindrical geometry and with a wound electrochemical core, obtained by the method according to the invention.

The cell 1 comprises a housing 10, formed itself by a tube 2 with a cylindrical cross section, a bottom cover 3 and a top cover 4, depicted separately in FIG. 1. Each cover constitutes a terminal connected to an electrical pole of the electrochemical core of the cell 1. For example, the bottom cover 3 can constitute a negative terminal B− and the top cover 4 can constitute a positive terminal B+.

FIG. 1B depicts the cell 1 assembled, the bottom 3 and top 4 covers being placed at the ends of the tube 2 with a cylindrical cross section. As shown by the arrow C in this FIG. 1B, the circulation of the gas in the cell 1 takes place in the longitudinal direction of the electrochemical core situated inside the cell 1, passing through the bottom 3 and top 4 covers. In this regard, the bottom 3 and top 4 covers may comprise an opening 5 sufficient to allow the gas to circulate.

Thus, according to the configuration of the terminals B+, B− of the cells 1, it may be possible to stack a plurality of cells 1 and to connect them in series, the gas then being able to circulate passing through the cells 1, as depicted in FIG. 1B. Advantageously, the gas may circulate passively (for example by a speed wind or under pressure) or actively (for example by the use of a flow gas).

Since the present invention can advantageously make it possible to adapt metal-gas, and in particular Li-air, technology to the principles of manufacturing elementary electrochemical cells of the already known Li-ion type, the example of an elementary electrochemical cell 1 of the Li-air type with dimensions identical to the current type 18650 electrochemical cells is considered here. Thus the various steps of the method according to the invention not developed here may advantageously be compared to the methods for producing the wound cylindrical Li-ion cells already known.

For manufacturing the cylindrical cell 1 with a wound electrochemical core, the fact is taken into account that the electrochemical core of a cylindrical cell consists mainly of successive layers of metal electrode, electrolyte and gas electrode. Thus various configurations of superimposition of the layers are possible.

Figure 2A:
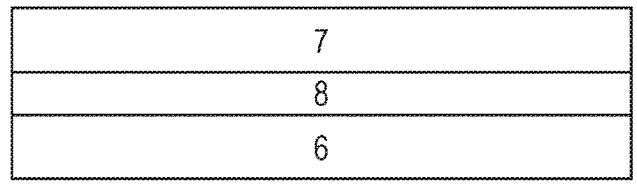
FIGS. 2A, 2B and 2C illustrate schematically the various possibilities of superimposition of the layers of an elementary electrochemical cell obtained by the method according to the invention.
Figure 2B:
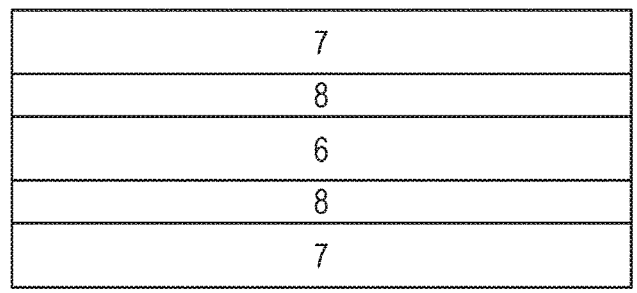
Figure 2C:
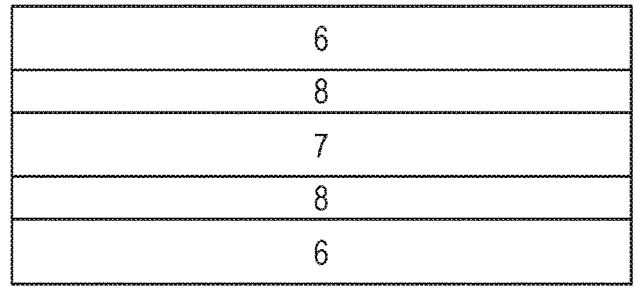

FIGS. 2A, 2B and 2C illustrate schematically the possibilities of superimposition of the layers of the cell 1.

First of all, with reference to FIG. 2A, it is possible to produce the electrochemical core of the cell 1 by successive superimposition of a metal negative electrode layer 6 consisting of a sheet of copper and a sheet of metal lithium covered with a protective membrane, a layer of electrolyte 8 consisting of a separator layer soaked in electrolyte, and a positive gas electrode layer 7 consisting of a nickel grille covered with a fine layer of the GDL (gas diffusion layer) type promoting the diffusion of the gas homogeneously on the surface of the positive electrode 7 and following the shape of the nickel grille.

Moreover, with reference to FIG. 2B, it is also possible to produce the electrochemical core of the cell 1 in the following manner. A separator layer soaked in electrolyte 8 and a positive electrode layer 7 are superimposed successively on either side of the metal negative electrode layer 6, the negative electrode 6 and positive electrode 7 layers being of the same composition as those described with reference to FIG. 2A. The copper sheet then fulfils a role of plane of symmetry of the stack of layers, the external layers being formed by the nickel grilles covered with a layer of the GDL type.

Furthermore, with reference to FIG. 2C, it is also possible to have an arrangement that is the opposite to that provided with reference to FIG. 2B, namely that the positive gas electrode layer 7 in FIG. 2C replaces the metal negative electrode layer 6 in FIG. 2B, and that two negative electrode layers 6 in FIG. 2C replace the two positive electrode layers 7 in FIG. 2B.

The positive 7 and negative 6 electrode layers in FIG. 2C are therefore the same as for FIG. 2B. However, the positive electrode layer 7 may correspond to a stack of two positive electrode sub-layers 7 (not shown) separated by a layer of a gas-diffusing element, allowing the diffusion of gas, this element then being the plane of symmetry of the global stack of the layers, the external layers being formed by the copper layers.

It should be noted that, in a variant embodiment of the stack of the various layers of the electrochemical core of the cell 1, the layer of electrolyte 8 may comprise on either side an insulating material providing the sealing of the layer of electrolyte 8. More particularly, the separator, previously soaked in electrolyte, may have on either side on its edge an isolating bead providing the seal for the electrolyte, sufficiently flexible to absorb the shear forces during the winding of the electrochemical core and chemically neutral. This bead may advantageously be produced from an elastomer material. Thus, once the electrochemical core has been wound, the electrolyte can be confined in the separator, without risk of leakage through the bottom 3 and top 2 covers of the housing 10.

The possibilities existing for the formation of gas circulation spaces E for conveying gas to the positive gas electrode or electrodes 7, in accordance with the manufacturing method according to the invention, will now be described.

The gas circulation spaces E may advantageously be formed by a separation of the layers of the electrochemical core. Several possibilities for leaving a gas circulation space E on the surface of a positive electrode 7 can be envisaged.

First of all, the possibility of disposing struts 9 in the winding of the electrochemical core Ce of the cell 1 are illustrated in FIGS. 3A and 3B. More particularly, FIG. 3A depicts, in cross section, the winding of the cylindrical cell 1 with the presence of struts 9, and FIG. 3B shows, in perspective, an example of such a strut 9 used for forming gas circulation spaces E.

The manufacturing method according to the invention can thus comprise the step consisting of disposing, on the surface of one or more gas electrode layers, in particular the positive electrode layers 7 in the example described here, struts 9 spaced apart from one another in order to form gas circulation spaces E, as can be seen in FIG. 3A.

Struts 9 may be in the form of cylindrical, hollow, porous or solid rods, as can be seen in FIG. 3B.

The struts 9 may be disposed on the surface of the gas electrode layer or layers, preferably regularly, and/or preferentially substantially parallel to one another, and/or preferentially in the direction of the cylindrical-geometry cell 1 to be obtained.

The struts 9 may have the smallest possible cross section but must nevertheless leave sufficient space E to make the gas circulate once the electrochemical core Ce is wound.

Preferably, the number of struts 9 used is also limited so as not to obstruct the longitudinal circulation of the gas in the cell 1 once the latter is wound.

Moreover, FIGS. 4A, 4B and 4C illustrate schematically the possibility of disposing, on a gas electrode layer or between two gas electrode layers, in particular the positive electrode layers 7 in the example described here, a flexible gas diffusion layer 11*a*, 11*b* or 11*c* intended to form a gas circulation space E, respectively for the possibilities of superimposition of the layers of an elementary electrochemical cell in FIGS. 2A, 2B and 2C.

More precisely, FIG. 4A illustrates the possibility of disposing a flexible gas diffusion layer 11*a* or 11*c* on the positive electrode layer 7 of the configuration in FIG. 2A.

FIG. 4B illustrates the possibility of disposing a flexible gas diffusion layer 11*b* or 11*c* on one of the positive electrode layers 7 of the configuration in FIG. 2B.

FIG. 4C illustrates the possibility of disposing a flexible gas diffusion layer 11*a* or 11*c* between the two positive electrode layers 7 of the configuration in FIG. 2C (the positive electrode layer 7 in FIG. 2C has been divided into two positive electrode layers 7).

For the three examples in FIGS. 4A, 4B and 4C, the flexible gas diffusion layer may be a porous flexible foam 11*c*, having in particular sufficient porosity to be almost perfectly permeable to gas and thus to promote its circulation. The thickness of the porous flexible foam 11*c* is preferentially a good compromise between the saving in space (low thickness) and the assurance of good circulation of gas, once the cell 1 is wound.

Moreover, for the three examples in FIGS. 4A, 4B and 4C, the flexible gas diffusion layer may be a flexible gas diffusion plate 11*a* or 11*b*, and in particular a single-pole plate 11*a* for the examples in FIGS. 4A and 4C or a twin-pole plate 11*b* for the example in FIG. 4B.

The thickness of the single-pole plate 11*a* or twin-pole plate 11*b* is preferentially as small as possible but must sufficiently ensure circulation of the gas once the cell 1 is wound.

Figure 5:
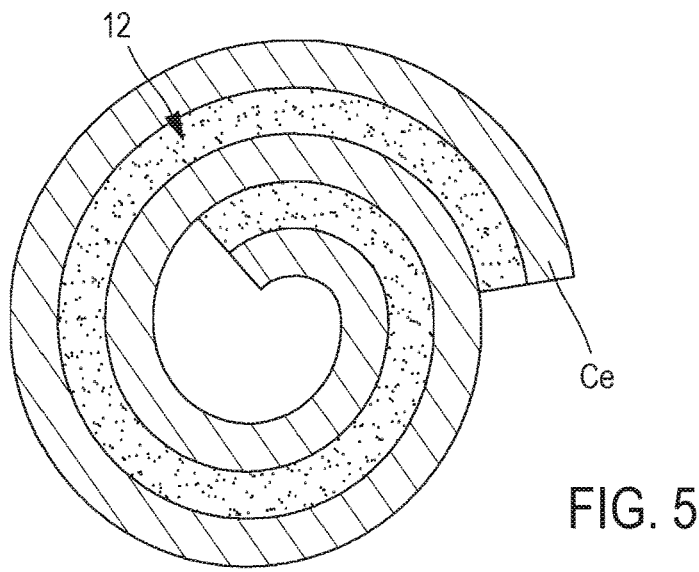
FIG. 5 illustrates, in cross section, the possibility of disposing, on the surface of a gas electrode of an elementary electrochemical cell, a shaping element during the winding of the wound electrochemical core.

FIG. 5 moreover illustrates, in cross section, the possibility of disposing, on the surface of a gas electrode 7, a shaping element 12 when the electrochemical core Ce is wound.

The shaping element 12 may be any separation element and may correspond among other things to a strut, a preform, a single-pole or twin-pole plate or a thickness element.

Thus, on the surface of at least one gas electrode layer, in particular a positive electrode layer 7, of the electrochemical core Ce, a separation layer is interposed in the form of a shaping element 12, the gas electrode layer being in particular able to be a top positive electrode layer 7 of a wound electrochemical core Ce as described with reference to FIGS. 2A and 2B.

Figure 6:
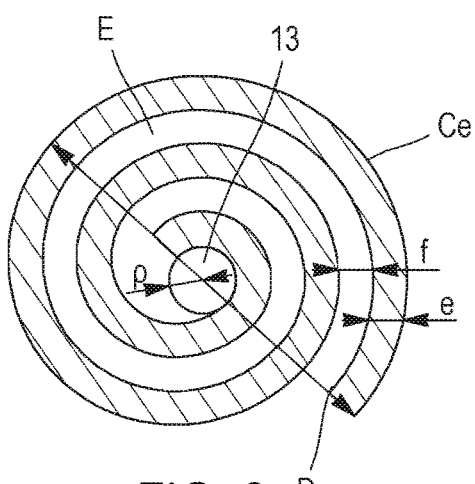
FIG. 6 illustrates, in cross section, the winding of the electrochemical core of an elementary electrochemical cell around a winding element.

Once the electrochemical core Ce is provided with the shaping element 12 wound, and if the electrode materials are preferentially sufficiently plastically deformed so that the electrochemical core Ce maintains its shape, the shaping element 12 is removed in order to leave a gas circulation space E. After removal of the shaping element 12, a configuration of the electrochemical core Ce is obtained as shown in FIG. 6.

The various configurations described with reference to FIGS. 3A, 3B, 4A, 4B, 4C and 5 may, where applicable, be combined together.

Moreover, preferentially, the gas circulation space or spaces E, once the assembly is wound, have a thickness between each turn of the electrochemical core Ce of approximately one millimetre in order to give rise to an excessive thickness of the cell 1 or too little compactness, while remaining effective.

Furthermore, for a configuration of the electrochemical core Ce as described with reference to FIG. 2A, the separation means 9, 11*a*, 11*c* or 12 are preferentially produced from an insulating material in order to electrically insulate the positive 7 and negative 6 electrode layers. On the other hand, for the configurations of the electrochemical core Ce as described with reference to FIGS. 2B and 2C, the separation means 9, 11*b*, 11*c* or 12 are preferentially produced from an electrically-conductive material in order to electrically connect together the electrode layers with the same pole thus in contact once the assembly is wound.

With regard to the connection of the positive 7 or negative 6 electrode layers, the method also comprises the step consisting of evenly disposing and welding conductive metal wires on the surface of each of the electrode layers. The metal wires situated on the positive electrode layer or layers 7 project at one of the ends of the electrochemical core Ce, those situated on the negative electrode layer or layers 6 project at the other end of the electrochemical core Ce. It is then desirable to ensure that the metal wires sufficiently project beyond the electrode layers or to be able to easily weld together those connected to the same pole, so as to be able to connect the terminal of said corresponding pole in a subsequent step.

The diameter of the metal wires is advantageously less than the thickness of a separation means 9, 11*a*, 11*b*, 11*c* or 12, and it is also desirable to ensure that there are a limited number of metal wires in order not to obstruct the longitudinal circulation of the gas in the cell 1 once the latter has been wound and the metal wires welded together. Preferentially, the metal wires are situated so as to be on an axis transverse to the spool once the electrochemical core Ce has been wound.

The manufacturing method according to the invention may also comprise the step consisting of winding the electrochemical core Ce of the cell 1 around a winding element 13, in particular a mandrel 13, as shown in FIG. 6.

FIG. 6 illustrates in fact the winding of the electrochemical core Ce of the cell 1 around the mandrel 13, and also illustrates certain parameters of sizing of the electrochemical core Ce.

The electrochemical core Ce of the cell 1, consisting of the winding of layers as described previously, is preferentially wound around a mandrel 13. Preferentially, each layer of the electrochemical core Ce has a different winding length, directly dependent on the number of windings and the thickness of the electrochemical core Ce, as well as the space E for allowing circulation of gas between two windings. In addition, the total size of the cell 1 wound will depend on the diameter of the mandrel 13 and on the thickness between two half-turns. It is thus desirable to ensure that a compromise is obtained for the diameter of the mandrel 13 between reasonable dimensions and mechanical strength, as well as for taking account of the minimum radius of curvature acceptable for the materials constituting the electrochemical core Ce.

Thus, by making the approximation that a half-winding i has a constant radius of curvature over an angle it, the inside radius $\rho$ of the mandrel 13 can be sized according to the outside diameter D of the cell 1, the thickness e of the electrochemical core Ce, the thickness f of the space E between two windings (for example f=0 in the configuration in FIG. 2C) and the number n of half-windings, in accordance with the following equation:

$$\rho = \frac{[D - (e + f) * n - 1)]}{2}$$

It is also possible to calculate the number of half-windings according to the outside diameter D of the cell 1, the thickness e of the electrochemical core Ce, the thickness f of the space E between two windings and the outside radius $\rho$ of the mandrel 13, in accordance with the following equation:

$$n = 1 + \frac{(D-2)*\rho}{e+f}$$

With the approximation that a half-winding i has a constant radius of curvature over an angle $\pi$, the following equation is then obtained for the total length l of the internal layer consisting of n half-windings of radius $r_i$:

$$l = \pi * \left[2*\rho + \sum_{i=0}^{n}(e+f)*i\right]$$

Likewise, for the total length L of the external layer consisting of n half-windings of radius $R_i$, there is the following equation:

$$L = \pi * \left[2*(\rho + e) + \sum_{i=0}^{n}(e+f)*i\right]$$

That is to say recurrently:

$$\begin{cases} l = l + \pi * [\rho + (e+f)*i] \\ L = l + 2*e*\pi \\ i = i + 1 \end{cases}$$

It is even possible to calculate the lengths $\lambda_j$ of the intermediate layers $C_{int}$ situated between the top layer $C_s$ and the bottom layer $C_i$ of a winding of the electrochemical core Ce according to the length l of the bottom layer $C_i$ unwound and their distance j with respect to said bottom layer $C_i$ by the following equation:

$$\lambda_j = l + 2*\pi*j.$$

Figure 7:
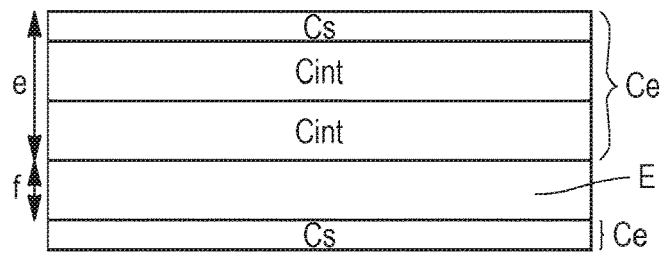
FIG. 7 depicts, schematically, in cross section, the various top, intermediate and bottom layers of a winding of the electrochemical core of an elementary electrochemical cell according to the invention, as well as the start of the following winding, with the presence of a gas circulation space between the windings.

FIG. 7 thus shows schematically, in cross section, various top $C_s$, intermediate $C_{int}$ and bottom $C_i$ layers of a winding of the electrochemical core Ce, as well as the start of the following winding, with the presence of a gas circulation space E between the windings.

It should be noted that the top layer $C_s$ may be a positive electrode layer 7 or a negative electrode layer 6. Likewise, the bottom layer $C_i$ may be a positive electrode layer 7 or a negative electrode layer 6. The intermediate layers $C_{int}$ may comprise at least one positive electrode layer 7 and/or at least one negative electrode layer 6 and/or at least layer of electrolyte 8. A winding of the electrochemical core Ce comprising a top layer $C_s$ and bottom layer $C_i$ and one or more intermediate layers $C_{int}$ may be like the ones described for example with reference to FIGS. 2A, 2B and 2C.

Once the length of each layer of the electrochemical core Ce has been sized and superimposed, the layers of the electrochemical core Ce can be cut and can then be fixed to the winding element or mandrel 13, preferentially by adhesive bonding, ensuring that there is no short-circuit. Next, the layers of the electrochemical core Ce can be wound around the mandrel 13, the mandrel 13 being able to be permanent, in which case its density is advantageously as low as possible, or removed after this operation. If the mandrel 13 is removed, the space E left by its imprint can make it possible to absorb the variations in volume in normal operation, and can also advantageously be occupied by one or more thermal regulation systems and/or one or more sensors. Once the cell 1 is wound, it also desirable to fix the other end to the outside turn, preferably by adhesive bonding, ensuring that there is no short-circuit.

Moreover, once the elementary electrochemical cell 1 has been provided with its wound electrochemical core Ce, the manufacturing method according to the invention comprises the step of fixing, in particular by welding, at each of the ends of the cell 1, metal wires connecting the electrodes of the same pole together, and the step of inserting the electrochemical core Ce in its packaging or housing 10.

As indicated previously with reference to FIGS. 1A and 1B, and as also shown in FIGS. 9A, 9B and 9C, the housing 10 of the cell 1 comprises three parts, namely a tube with a cylindrical cross section and two bottom 3 and top 4 covers. The housing 10 of the cell 1 may be flexible or rigid.

In the case of a rigid housing 10, the tube 2 with a cylindrical cross section may advantageously be produced from a rigid, lightweight and strong insulating material, preferentially a polymer, for example PP, PPS, PVDF, PET, PMP, HDPE, PA 6-6 or ABS). In the configurations described with reference to FIGS. 2A and 2B, the tube 2 with a cylindrical cross section of the rigid housing 10 may have separation means 9, 11a-11c or 12 as described previously.

These separation means 9, 11a-11c or 12 may initially be disposed and fixed on the external layer of the last turn, in the same way as with all the other turns, or they may be fixed or obtained directly on the internal part 14 of the housing 10. These separation means may for example be rods, struts, longitudinal lugs, a flexible gas diffusion plate or a flexible porous foam.

Figure 8A:
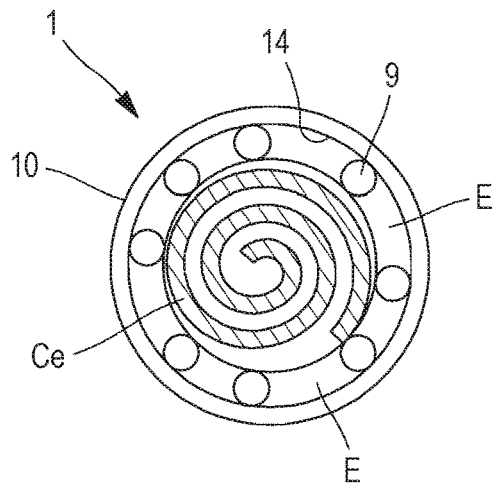
FIGS. 8A and 8B illustrate, in cross section, two variant embodiment of separation means between the electrochemical core of the elementary electrochemical cell and the body of the cell housing.
Figure 8B:
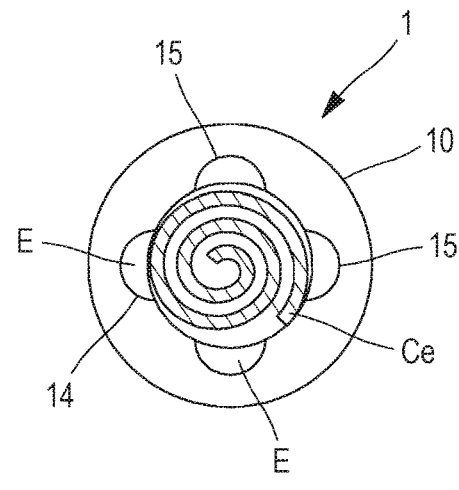

FIGS. 8A and 8B illustrate, in cross section, two variant embodiments of the means of separation between the electrochemical core Ce of the cell 1 and the body 2 of the housing 10.

In FIG. 8A, struts 9 are positioned on the internal part 14 of the tube 2 with a cylindrical cross section of the housing 10 so as to form the gas circulation spaces E.

In FIG. 8B, flutes 15 are formed on the internal part 14 of the tube with a cylindrical cross section of the housing 10 so as to create gas circulation spaces E.

Moreover, the inside diameter of the tube 2 with a cylindrical cross section may preferentially have sufficient sliding clearance to be able to insert the wound electrochemical core Ce therein, as well as the means 9 of separation from the tube 2 of the housing 10. In the configuration described with reference to FIG. 2C, the external turn of the spool being the copper collector, it may not be necessary to add means of separation from the tube 2 with a cylindrical cross section. The inside diameter of the latter may preferentially have sufficient sliding clearance to be able to insert the electrochemical core Ce easily in the tube 2 of the housing 10.

Furthermore, in the case of a flexible housing 10, the tube or body 2 with a cylindrical cross section of the flexible housing 10 may be obtained from a very fine material, in particular a film, the mechanical strength of the electrochemical core Ce then being considered to be sufficient for the cell 1, or thicker, such as the materials currently used for flexible pouch cells. With this type of flexible housing 10, once the step of winding the electrochemical core Ce has been performed, it is possible to wind it with one or more turns of the film constituting the body 2 of the housing 10, in order to sufficiently protect the cell 1 (for example mechanically if required, electrical insulation, impermeability to water, chemical protection, among other things). Next, it is possible to bond or thermoseal the housing 10 according to the material used. Likewise, as described previously, the housing 10 may comprise, on its internal surface 14, a space E allowing the circulation of gas on the external turn of the electrochemical core Ce in the configurations described with reference to FIGS. 2A and 2B. The space E is likewise obtained by virtue of the separation means 9, 11a-11c or 12 similar to those described previously with reference to FIG. 3A-3B, 4A-4C, 5 or 8A. However, because of the flexibility of the material used, it may not be possible to use flutes 15, as described with reference to FIG. 8B.

Once the electrochemical core Ce has been disposed in the tube 2 with a cylindrical cross section, it is possible to put the top 4 and bottom 3 covers on either side of the tube 2 with a cylindrical cross section. The top 4 and bottom 3 covers may be obtained by cropping and pressing a grille of conductive material. The method then comprises the step of welding the metal wires of each pole on the covers 3 and 4 ensuring that they obstruct the circulation of the gas as little as possible, the covers 3 and 4 then constituting the terminals B+, B−, each terminal thus being situated at each end of the cell 1. Preferentially, the covers 3 and 4 may have a circular planar surface, in particular with the same diameter as the outside diameter of the tube 2 with a cylindrical cross section, this planar surface being for example a solid grille for homogenising flow obtained from a conductive material. The grille may advantageously be previously formed by forging methods in order to have a suitable form for assembly. The covers 3 and 4 may advantageously have a joint providing impermeability to gas in order to prevent leakages and to optimise its circulation to the gas electrodes in the cell 1. The covers 3 and 4 can then be fixed to the body 2 with a cylindrical cross section, several solutions for doing this being envisageable. Thus they may be screwed to the body 2, after threading of the covers 3 and 4 and of the body 2 (quarter of a turn at a maximum in order not to twist the wires connecting the electrochemical core C and the covers 3 and 4), plastically deformed (for example, crimping), adhesively bonded or welded if they are produced from a weldable material.

Moreover, preferentially and for better efficacy, the gas may circulate and arrive at the cell 1 under pressure. In this embodiment, it is possible to add to the top cover 4 a hermetic gas connection 16 in order to optimally and hermetically adapt the gas inlet pipe to the cell 1.

FIGS. 9A, 9B and 9C show in perspective an example of a cell 1 comprising a top cover 4 provided with a hermetic gas connector 16. More precisely, FIG. 9A depicts, in non-assembled configuration, the top 4 and bottom covers 3, the electrochemical core Ce of the cell 1 and the body 2 with a cylindrical cross section. FIG. 9B shows the top cover 4 in isolation, and FIG. 9C shows the cell 1 in a configuration assembled with its housing 10.

The architecture of the top cover 4 is optimised in order to facilitate admission of gas (arrows C) distributed uniformly towards the electrochemical core Ce. The flow-homogenisation grille may also supplement this role. Thus the hermetic gas connector 16 for the admission of gas by pipe and the gas homogenisation grille may have different diameters but a circular cross section and may be coaxial with the longitudinal axis of the body 2 with a cylindrical cross section and the electrochemical core Ce. It is also desirable to ensure that the terminal of the top cover 4 is left accessible in order to be able to connect it electrically.

Manufacture by Prismatic Winding

The production of an elementary electrochemical cell 1 of the metal-gas type, with a prismatic architecture geometry and with a wound electrochemical core Ce is described below.

FIGS. 10A and 10B thus show, in perspective and respectively in partial and non-assembled view, an example of such a prismatic-geometry cell 1 with a wound electrochemical core Ce, obtained by the method according to the invention.

Just as with the example described with reference to FIGS. 1A and 1B, the cell 1 comprises a housing 10, itself formed by a body or tube 2 with a rounded rectangular cross section, a bottom cover 3 and a top cover 4, shown separated in FIG. 10B. Each cover constitutes a terminal connected to an electrical pole of the electrochemical core of the cell 1. For example, the bottom cover 3 may constitute a negative terminal B− and the top cover 4 may constitute a positive terminal B+.

As shown by the arrows C in FIG. 10B, the circulation of the gas in the cell 1 takes place in the longitudinal direction of the electrochemical core Ce situated inside the cell 1, passing through the bottom 3 and top 4 covers. In this regard, the bottom 3 and top 4 covers may comprise a sufficient opening 5 to allow the circulation of gas.

Thus, according to the configuration of the terminals B+, B− of the cells 1, it may be possible to stack a plurality of cells 1 and to connect them in series, the gas then being able to circulate through the cells 1, as shown in FIG. 10B.

Advantageously, the circulation of gas may take place dynamically either passively (for example by a speed wind or under pressure) or actively (for example by the use of a flow gas).

Since the present invention can advantageously make it possible to adapt metal-gas technology, in particular Li-air, to the principles of manufacturing electrochemical cores of the Li-ion type already known, the example of an elementary electrochemical cell 1 of the Li-air type with dimensions identical to current prismatic electrochemical cells mainly present in industry is considered here. Thus the various steps of the method according to the invention that are not developed here may advantageously be compared to the methods for producing the wound prismatic Li-ion cells already known.

For manufacturing the prismatic cell 1 with the wound electrochemical core Ce, the method is substantially equivalent to one described previously for a cell 1 with a wound cylindrical geometry. Thus the examples described with reference to FIGS. 2A-2C, 3A-3B, 4A-4C, 5, 6, 7, 8A-8B and 9A-9C can be transposed to the case of a cell 1 with prismatic geometry by advantageously adapting the elements described to the fact that the cell 1 has a prismatic rather than cylindrical geometry.

However, the superimposed layers of the electrochemical core Ce of the cell 1 with prismatic geometry have a few differences from those of the electrochemical core Ce of a cell 1 with cylindrical geometry. This is because the cross section of the mandrel 13 is not circular but preferentially with a rounded rectangular shape. In addition, on the continuous layer of the current connector 17 of the negative electrode 6, namely copper in the case of a cell 1 of the lithium-air type, the other successive layers are disposed not continuously but sequenced, thus constituting a succession of patterns of electrochemical cores Ce' on a complete copper strip. Winding in a "pattern" is then spoken of.

Figure 11:
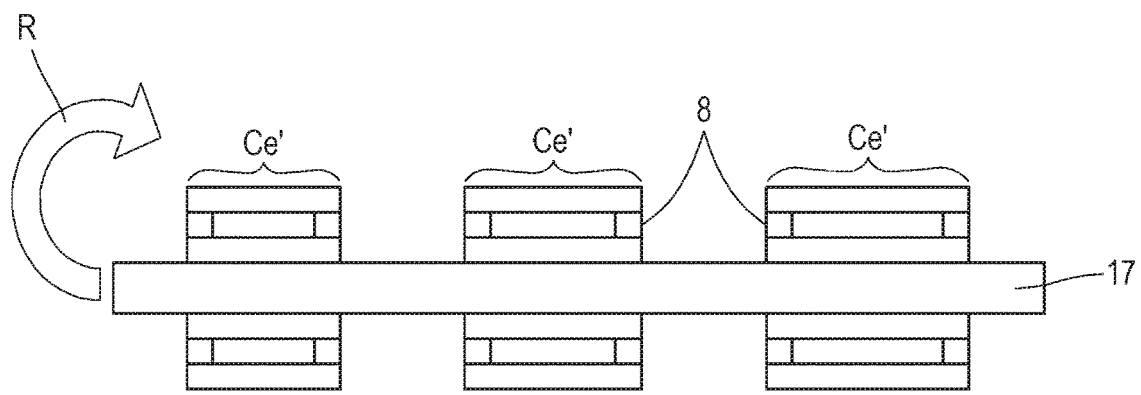
FIG. 11 depicts, in cross section, an example of an elementary electrochemical cell with a prismatic architecture geometry, sequenced by the presence of a plurality of electrochemical cores on a current collector.

FIG. 11 shows, in cross section, an example of an electrochemical cell 1 before prismatic-geometry winding, sequenced by the presence of a plurality of electrochemical cores Ce' on the current collector 17 (the winding being shown schematically by the arrow R). In addition, in FIG. 11, the reference 8 represents the layers of electrolyte in the form of electrolyte joints between positive 7 or negative 6 electrode layers.

Moreover, the electrochemical cores Ce' forming the global electrochemical core Ce of the cell 1 may have a variable length depending on the windings of the assembly. Thus the first electrochemical core layer may have a length equal to that of the mandrel 13 on which it will be wound, and then the following layers may have an increasing length in order to follow the variation in thickness of the electrochemical core Ce while being wound (winding in "sequenced pattern" is spoken of). This arrangement can advantageously be adapted whatever the chosen configuration of the layers, in particular whatever those described with reference to FIGS. 2A, 2B and 2C.

To calculate the total length of each layer of an electrochemical core Ce', it is possible to calculate the length of each half-turn, and to add between each half-turn the length of the electrochemical core. The length of the half-turn will then be that of the part comprising only the current collector 17. The length of the half-turn may be variable, in particular increasing along with the number of turns wound around the mandrel 13, in accordance with a calculation similar to that described previously for the case of a cylindrical-geometry cell 1, assuming that their radius of curvature is constant over a turn. The length of an electrochemical core Ce' may also be variable, in particular increasing along with the number of turns wound around the mandrel 13, or constant, which can simplify the calculations but increases the weight of the copper current collector 17. The length, constant or not, of each electrochemical core Ce' can then be added to the length of each half-turn.

The various copper current collector layers may preferentially be in contact with each spiral once folded. It is also desirable for the gas electrodes to be so, which can be done by wires (or tongues) projecting beyond and welded to each other, ensuring that they do not obstruct the circulation of gas in the cell 1 once wound.

Manufacture by Prismatic Folding in a Z

The production of an elementary electrochemical cell 1 of the metal-gas type is described below, with prismatic architecture geometry and with an electrochemical core Ce folded in a Z (or "Z folding").

Figures 12A, 12B:
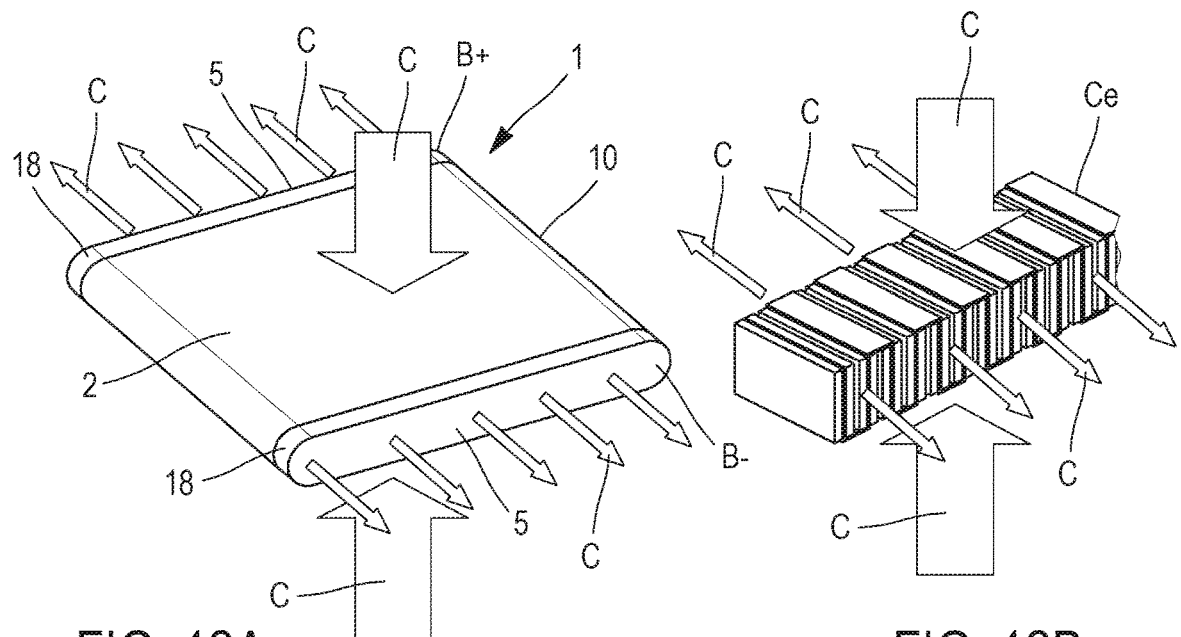
FIGS. 12A and 12B depict, in perspective and respectively in assembled view and without a housing or covers, an example of an elementary electrochemical cell with a prismatic architecture geometry and with an electrochemical core folded in a Z obtained by the manufacturing method according to the invention.

FIGS. 12A and 12B thus show, in perspective and respectively in assembled view and without a housing or covers, an example of such a prismatic geometry cell 1 with an electrochemical core Ce folded in a Z, obtained by the manufacturing method according to the invention.

The cell 1 comprises a housing 10, formed itself by an insulating body 2 with four faces, two opposite faces of which are grilles and the other two opposite faces of which are preferentially solid, and by two conductive lateral covers 18, each lateral cover 18 constituting a terminal B+ or B− connected to a pole of the electrochemical core Ce.

As shown by the arrows C in the two FIGS. 12A and 12B, the circulation of gas in the cell 1 enters through the grilles of the insulating body 2 and exits through the lateral covers 18, said lateral covers 18 having sufficient opening 5 for the circulation of gas. Thus the lateral covers 18 are on the edges of the electrochemical core Ce visible in FIG. 12b and the grilles are on the top and bottom faces of cell 1, facing the gas electrodes.

In this configuration, the various layers of the electrochemical core Ce are preferentially arranged in accordance with the possibility described with reference to FIG. 2B, except that the electrochemical core Ce is sequenced in a plurality of electrochemical cores Ce', as described with reference to FIG. 10. The electrochemical cores are no longer wound but folded in alternation in one direction and then the other in order to obtain a stack of electrochemical cores. Preferentially, the circulation C of the gas takes place dynamically in a passive fashion (for example speed wind, under pressure) or active fashion (for example flow gas).

Since the present invention can advantageously make it possible to adapt metal-gas technology, and in particular Li-air, to the principles of manufacturing elementary electrochemical cells of the Li-ion type already known, the example of an elementary electrochemical cell 1 of the Li-air type with dimensions identical to current prismatic electrochemical cells mainly present in industry is considered here. Thus the various steps of the method according to the invention not developed here may advantageously be compared to the methods for producing the Z-folded prismatic Li-ion cells already known.

For manufacturing the prismatic cell 1 with the Z-folded electrochemical core Ce the method uses a superimposition of layers of the electrochemical core.

Figure 13:
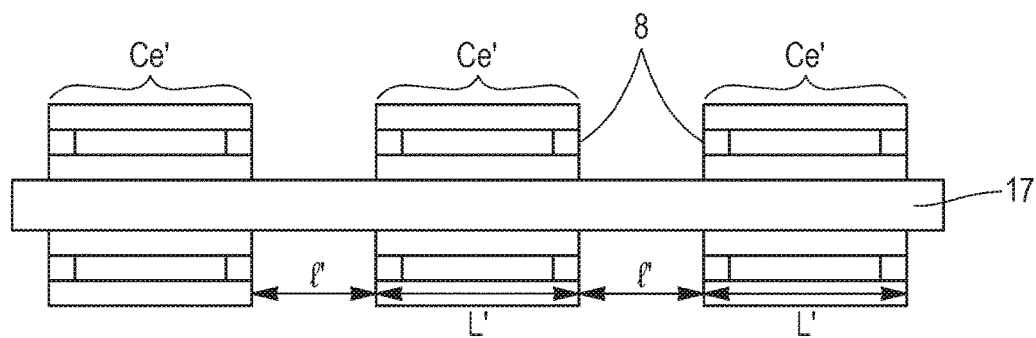
FIG. 13 illustrates, in cross section, an example of an elementary electrochemical cell sequenced by the presence of a plurality of electrochemical cores forming the global electrochemical core.

Thus FIG. 13 illustrates, in cross section, an example of an elementary electrochemical cell 1, before folding, sequenced by the presence of a plurality of electrochemical cores Ce' forming the global electrochemical core Ce, and then folded in order to form the cell 1. In addition, in FIG.

13, the reference 8 represents a layer of electrolyte, in particular an electrolyte joint.

Thus, advantageously, from a copper strip forming a current collector 17, electrochemical cores Ce' facing each other on either side of the copper strip in a sequenced manner are produced in alternation, said electrochemical cores Ce' being in particular produced in accordance with the configuration presented with reference to FIG. 2B and regularly spaced along the copper strip.

The length l' between the electrochemical cores Ce', expressed according to the length L' of electrochemical core Ce', is given by the following equation:

$$l'=2\times L'+e,$$

where e represents the thickness of space between two gas electrodes.

As described previously, separation means can be provided on the electrochemical core Ce in order to form gas circulation spaces. Preferentially, these separation means may be separation layers previously soaked in electrolyte, each having, on either side of their edge, an isolating bead ensuring impermeability to electrolyte, thus confined in the separation layer.

In order to provide sufficient space E for the circulation of gas between the gas electrodes once the electrochemical cores Ce' are folded, it is advantageously possible to dispose small elements, placed and bonded on the copper strips 17 at the folding zone between each electrochemical core Ce', regularly spaced along the folding zone while leaving sufficient space E to allow the gas to circulate towards the gas electrode or electrodes. Several arrangement options can be envisaged. In a first possibility, it is possible to dispose small struts 9 regularly spaced so that they are situated at the hollow of each fold of the copper strip 17. In a second possibility, it is possible to dispose the same struts 9 not at the hollow of each fold, but they are bonded at the end of each fold. A third possibility can use tongues of gas diffusion layers of the GDL type, thick, disposed between each fold over the entire height of said fold, the tongues preferentially not obstructing the entire length of the fold in order to minimise pressure drops in the gas circulation.

Advantageously, the gas circulation space E, formed once the assembly has been folded, has a thickness between each fold of around one millimetre in order not to give rise to excessive thickness of a cell 1 or an excessively low compactness while remaining effective.

Advantageously also, the separation means may be produced from an electricity conducting material in order to electrically connect together the electrodes of the same pole thus in contact once the assembly is folded.

With regard to the connections of the positive 7 or negative 6 electrode layers, wires of conductive metal can be disposed regularly and welded on the surface of each of the electrode layers, those situated on the positive electrode or electrodes 7 projecting at one end of the electrochemical core Ce, and those situated on the negative electrode or electrodes 6 projecting at the other end of the electrochemical core Ce. It may also be desirable to ensure that the wires of the electrodes are projecting sufficiently in order to be able to easily weld together those that are connected to the same pole, in order to be able to connect the terminal of said corresponding pole in a subsequent step. In addition, the diameter of the metal wires is preferentially less than the thickness of the separation means and it is desirable to ensure that there are not too many metal wires in order not to obstruct the longitudinal circulation of the gas in the cell 1 once the latter is folded and the wires connected together by welding.

For folding the electrochemical core Ce, once the strip 17 of electrochemical cores Ce' has been produced, it is possible to cut it to the correct length, in other words the total folding length, and it is possible to fold it at an angle of 180° between each electrochemical core Ce', advantageously in accordance with the known Z-folding methods. It is desirable to ensure moreover that the separation means, in particular the struts 9, leave sufficient spaces E for the circulation of gas, as can be seen in FIG. 14.

Furthermore, once the cell 1 is folded, it is possible to weld at each of its ends the metal wires connecting the electrodes of the same pole together, and it is possible to insert it in its housing 10. The housing 10 comprises in particular three parts, namely a prismatic body with two opposite openings and two covers constituting the terminals of each pole.

The prismatic body is advantageously produced from an insulating, rigid, lightweight and strong material, preferentially a polymer (for example PP, PPS, PVDF, PET, PMP, HDPE, PA 6-6 or ABS). It may be obtained from a strip of polymer extruded and cut to a length equal to the perimeter of the prismatic body. The strip is divided into four identical longitudinal zones in pairs and distributed in alternation, the dimensions of which are those of the four faces once the prismatic body is folded. Two identical zones can be punched in order to form sufficient aerations for the circulation of gas, while keeping sufficient mechanical properties for the strength of the housing 10. Next, it can be folded to form a prismatic body with two opposite openings and can be bonded or welded if the material is weldable. In another variant, it is possible to punch on two identical faces a window that is as wide as possible while keeping sufficient dimensions for the mechanical strength of the housing. In yet another variant, the prismatic body can be obtained from a grille of extruded polymer that is folded directly into four parts, which can remove the punching step, said grille having to sufficiently allow the gas to circulate while keeping sufficient mechanical properties for the strength of the housing.

The housing may also be produced from aluminium or one of its alloys. It will then have to be ensured that the elementary electrochemical cell 1 is electrically insulated before inserting it therein, as well as each part of the housing from each other in order to prevent any short-circuit.

The internal dimensions of the prismatic body may preferentially have sufficient sliding clearance in order to be able to insert the folded electrochemical cell 1 therein.

Once the elementary electrochemical cell 1 is disposed in the prismatic body, the covers can be placed on either side of the prismatic body, said covers being able to be obtained by cropping and pressing a solid flow-homogenisation grille of a conductive material. The metal wires of each pole can be welded thereto, ensuring that they obstruct the circulation of gas as little as possible, the covers then constituting the terminals, each terminal thus being situated at each end of the cell 1. In a preferential embodiment, the dimensions of the covers can enable them to be inserted around the prismatic body. The covers may advantageously have a joint providing impermeability to gas in order to prevent leakages and to optimise its circulation at the gas electrodes in the cell 1. The covers may next be fixed to the prismatic body, several methods being envisageable. Thus they may be deformed plastically, in particular by crimping, bonded or welded if they are produced from a weldable material.

A description will now be given of a possibility of packing prismatic-geometry elementary electrochemical cells 1 with Z-folded electrochemical core Ce, as described previously.

Thus FIG. 15 depicts, in front view, a diagram of packing in rack modules 20 of prismatic cells 1 with Z-folded electrochemical core Ce, with a circulation of gas under pressure. In this FIG. 1, the reference 11a designates a single-pole plate, the reference 19 designates the cover of a cell 1, the reference 21 designates the main gas-inlet pipe and the reference 22 designates a gas-inlet pipe to a twin-pole plate 11b.

In a preferential embodiment and for better efficacy, the gas circulates and arrives at the cell 1 under pressure and/or gas flow. In such an embodiment, the prismatic body of the housing has, on its top and bottom faces, a punched window as described above. The plurality of prismatic cells can be stacked vertically, interposing them with twin-pole plates 11b with a size equal to the previously mentioned window. The twin-pole plates 11b having a gas-inlet opening at one end of their edge and no gas outlet opening, it is advantageously possible to connect the connection of each twin-pole plate 11b to a pressurised gas inlet, which can make it possible to inject the pressurised gas in each cell 1 while ensuring a homogeneous gas inlet at the gas electrodes. Thus the gas can arrive at the top and bottom faces of each cell 1 through the twin-pole plates 11b, and is expelled through the front and rear faces of each cell 1. The cells 1 can be connected together by their terminals, ensuring that the electrical connection does not obstruct the grille for the gas to be discharged from the cover. A vertical stack of cells 1 being able to be inserted and held in place in a rigid frame, said frame constituting a so-called rack module, it is thus possible to align a plurality of rack modules 20 in an energy storage system, the twin-pole plates 11b of said racks 20 all being connected to the pressurised gas inlet circuit. The discharge of the gas taking place through the terminals, that is to say the grilles of the covers, each module 20 can then be hermetic to gas. Thus the gas circulation device may be in isobaric closed circuit, affording a self-contained onboard gas system that is economical in gas and self-regulated.

Prismatic Stacking

The production of an elementary electrochemical cell 1 of the metal-gas type with prismatic architecture geometry and with an electrochemical core Ce comprising a stack of electrochemical core patterns Ce' is described below.

Thus FIG. 16 depicts, in perspective, an example of a prismatic-geometry cell 1 comprising a stacked electrochemical core Ce, in an assembled configuration of the cell 1.

The cell 1 comprises a housing 10, formed itself by an insulating body 2 with four solid faces, as well as by two conductive lateral covers 18, the two lateral covers 18 being situated facing and each lateral cover 18 constituting a terminal B+ or B− connected to a pole of the electrochemical core Ce.

As shown by the arrows C in FIG. 16, the circulation of gas in the cell 1 enters through one of the lateral covers 18 and exits through the other cover 18, said covers 18 having a sufficient opening 5 for the circulation of the gas. Thus the lateral covers 18 are on the edges of the electrochemical core Ce for circulation of gas perpendicular to the surface of the gas electrodes. In this configuration, the various layers of electrochemical cores Ce' can be arranged according to the configurations described with reference to FIGS. 2A, 2B and 2C, said electrochemical cores Ce' being able to be continuous or sequenced in the same way as those described for the cylindrical or prismatic electrochemical cells with wound electrochemical core. Advantageously, the gas circulates dynamically in a passive fashion (for example speed wind or under pressure) or active fashion (for example gas flow).

The present invention advantageously being able to make it possible to adapt metal-gas technology, and in particular Li-air, to the principles of manufacturing elementary electrochemical cells of the Li-ion type already known, the example is considered of an elementary electrochemical cell 1 of the Li-air type with dimensions identical to the current prismatic electrochemical cells principally present in industry. Thus the various steps of the method according to the invention not developed may advantageously be compared to the methods producing the stacked prismatic Li-ion cells already known.

For manufacturing the prismatic cell 1 with stacked electrochemical core Ce, the method uses a superimposition of layers of the electrochemical core.

It is thus possible to produce electrochemical cells 1 in a stack of a plurality of electrochemical cores Ce' in the same way as described with reference to FIGS. 2A, 2B and 2C. The electrochemical core Ce may be continuous or discontinuous. A cutting step may however be added in order to out each layer of electrochemical core Ce' to the dimensions of the cell 1.

Moreover, in order to provide sufficient space E for the circulation of the gas between the gas electrodes, once the various layers of electrochemical cores Ce' have been stacked, it is advantageously possible to dispose separation means between the gas electrodes. Several arrangement options can be envisaged. In a first possibility, it is possible to dispose small struts 9 regularly spaced and oriented in the longitudinal direction of circulation of the gas, that is to say in a direction normal to the surfaces of the covers. In a second possibility, it is possible to use a porous gas-diffusion element (foam, layer of the GDL type). However, the pressure drops may be greater. Advantageously, the gas circulation space E, formed once the assembly is stacked, has a thickness between each electrochemical core Ce' around one millimetre in order not to give rise to an excessive cell thickness or excessively low compactness while remaining effective.

With regard to the connection of the positive 7 or negative 6 electrode layers, it is possible to dispose regularly and weld the conductive metal wires on the surface of each of the electrode layers, those situated on the positive electrode or electrodes 7 projecting at one end of the electrochemical core Ce, and those situated on the negative or negative electrode 6 projecting at the other end of the electrochemical core Ce. It may also be desirable to ensure that the wires are allowed to project sufficiently from the electrodes in order to be able to easily weld together those that are connected to the same pole, so as to be able to connect the terminal of said corresponding pole in a subsequent step. In addition, the diameter of the metal wires is preferentially less than the thickness of the separation means and it is desirable to ensure that there are not too many metal wires in order not to obstruct the longitudinal circulation of the gas in the cell 1 once the latter is folded and the wires connected together by welding.

Once the electrochemical cores Ce' have been produced and cut, and the separation means and connections disposed, it is possible to stack them and it can be inserted in its housing or package. The housing comprises three parts, namely a prismatic body with two opposite openings, and two covers constituting the terminals of each pole.

The prismatic body is advantageously produced from an insulating, rigid, lightweight and strong material, preferentially a polymer (for example PP, PPS, PVDF, PET, PMP, HDPE, PA 6-6 or ABS). It may be obtained from a strip of polymer extruded and cut to a length equal to the perimeter of the prismatic body. The strip is divided into four identical longitudinal zones in pairs and distributed in alternation, the dimensions of which are those of the four faces once the prismatic body has been folded. Next, it is folded in order to form a prismatic body and is bonded or welded if the material is weldable. The housing may also be produced from aluminium or one of its alloys. It will then be necessary to ensure that the electrochemical cell 1 is electrically insulated before inserting it therein as well as each part of the housing from each other in order to prevent any short-circuit. The internal dimensions of the prismatic body may preferentially have sufficient sliding clearance to be able to insert therein the stacked electrochemical cell 1.

Once the elementary electrochemical cell 1 has been disposed in the prismatic body, the covers can be placed on either side of the prismatic body, said covers being able to be obtained by crimping and pressing a solid flow-homogenisation grille in a conductive material. The metal wires of each pole can be welded thereto, ensuring that they obstruct the gas circulation as little as possible, the covers then constituting terminals, each terminal being thus situated at each end of the cell 1. In a preferential embodiment, the dimensions of the covers can enable them to be inserted around the prismatic body. The covers may advantageously have a joint providing impermeability to gas in order to prevent leakages and optimise its circulation to the gas electrodes in the cell 1. The covers can then be fixed to the prismatic body, several methods being envisageable. Thus they may be deformed plastically, in particular by crimping, bonded or welded if they are produced from a weldable material.

Naturally the invention is not limited to the example embodiments that have just been described. Various modifications can be made thereto by a person skilled in the art.

The expression "comprising a" must be understood as being synonymous with "comprising at least one" unless the contrary is specified.

The invention claimed is:

1. A method for manufacturing an elementary gas-electrode electrochemical cell of metal-gas type, configured to be integrated in an electrochemical assembly module of an energy storage system, including an electrochemical core including at least one negative electrode and at least one positive electrode, the at least one negative electrode being a gas electrode layer and the at least one positive electrode being a metal electrode or vice-versa, the method comprising:
    producing the electrochemical core of the cell by winding plural windings, each winding including at least one negative electrode layer, a positive electrode layer, and a layer of electrolyte, around a winding element; and
    disposing a separation element between the windings of the electrochemical core of the cell to form gas circulation spaces for conveying gas to the gas electrode layer of each winding, the separation element being disposed in contact with the negative electrode layer and the positive electrode layer of different windings.

2. The method according to claim 1, wherein the electrochemical cell is of lithium-air, aluminium-air, or zinc-air type.

3. The method according to claim 1, further comprising manufacturing an elementary electrochemical cell with cylindrical or prismatic architecture geometry with production of an electrochemical core by the winding.

4. The method according to claim 3, further comprising producing the electrochemical core by successive superimposition of:
    a metal negative electrode layer, comprised of a sheet of copper and a sheet of metal lithium covered with a protective membrane,
    a layer of electrolyte, comprised of a layer of separator soaked in electrolyte,
    a positive gas electrode layer, comprised of a grille of nickel covered with a layer of gas diffusion layer (GDL) type promoting diffusion of gas evenly on a surface of the positive electrode.

5. A method for manufacturing an elementary gas-electrode electrochemical cell of metal-gas type, configured to be integrated in an electrochemical assembly module of an energy storage system, including an electrochemical core including at least one negative electrode and at least one positive electrode, the at least one negative electrode being a gas electrode layer and the at least one positive electrode being a metal electrode or vice-versa, the method comprising:
    producing the electrochemical core of the cell by stacking of a plurality of layers, including at least one negative electrode layer, a positive electrode layer, and a layer of electrolyte; and
    disposing a separation layer between the stacks of the layers of the electrochemical core of the cell to form gas circulation spaces for conveying the gas to the gas electrode layer or layers,
    wherein the electrochemical core is produced by successive superimposition, on both sides of a metal negative electrode layer, comprised of a sheet of copper and a sheet of metal lithium covered with a protective membrane, of an assembly formed by
        a layer of electrolyte, comprised of a layer of separator soaked in electrolyte, and
        a positive gas electrode layer, comprised of a nickel grille covered with a layer of gas diffusion layer (GDL) type promoting diffusion of the gas evenly on a surface of the positive electrode.

6. A method for manufacturing an elementary gas-electrode electrochemical cell of metal-gas type, configured to be integrated in an electrochemical assembly module of an energy storage system, including an electrochemical core including at least one negative electrode and at least one positive electrode, the at least one negative electrode being a gas electrode layer and the at least one positive electrode being a metal electrode or vice-versa, the method comprising:
    producing the electrochemical core of the cell by stacking of a plurality of layers, including at least one negative electrode layer, at least two positive electrode layers, and a layer of electrolyte; and
    disposing a separation layer between the at least two positive electrode layers of the electrochemical core of the cell to form gas circulation spaces for conveying the gas to the gas electrode layers,
    wherein the electrochemical core is produced by successive superimposition, on a side of each positive gas electrode layer, comprised of a nickel grille covered with a layer of gas diffusion layer (GDL) type promoting diffusion of gas evenly on a surface of the positive electrode, of an assembly formed by
        an electrolyte layer, comprised of a layer of separator soaked in electrolyte, and a metal negative electrode layer, comprised of a sheet of copper and a sheet of metal lithium covered with a protective membrane.

7. The method according to claim 3, further comprising disposing the separation element on a surface of at least one positive or negative electrode layer during the winding to form the electrochemical core, to form the gas circulation spaces for conveying the gas to the gas electrode layer of each winding.

8. The method according to claim 7, further comprising disposing, on a surface of one or more gas electrode layers, struts spaced apart from one another to form the gas circulation spaces.

9. The method according to claim 7, further comprising disposing, on a surface of one or more gas electrode layers, at least one flexible gas diffusion layer to form the gas circulation spaces.

10. The method according to claim 9, wherein the at least one flexible gas diffusion layer is a porous flexible foam.

11. The method according to claim 9, wherein the at least one flexible gas diffusion layer is a flexible gas diffusion plate.

12. The method according to claim 7, further comprising placing, on a surface of one or more gas electrode layers, a shaping element for shaping during the winding of the electrochemical core, the shaping element corresponding to one or more struts, preforms, single-pole or twin-pole plates, or thickness elements, and removing the shaping element to leave clear one or more of the gas circulation spaces between the layers of the electrochemical core.

13. The method according to claim 4, wherein the separation element is produced from an insulating material.

14. The method according to claim 5, wherein the separation layer is produced from a conductive material.

15. The method according to claim 3, further comprising disposing conductive wires on a surface of each of the positive and negative electrode layers, connecting together the conductive wires on the surface of the positive electrode layer, and connecting together the conductive wires on the surface of the negative electrode.

16. The method according to claim 3, wherein the electrochemical cell has a cylindrical architecture geometry, and wherein radius of the winding element is obtained by the following equation:

$$p = \frac{[D - (e + f) * (n - 1)]}{2}$$

in which:
D is outside diameter of the electrochemical cell,
e is thickness of the electrochemical core,
f is thickness of a space between two windings, and
n is a number of half-windings of the electrochemical core.

17. The method according to claim 3, wherein the layers of the electrochemical core are cut, then fixed to the winding element, and then wound around the winding element to form the electrochemical core of the electrochemical cell.

18. The method according to claim 3, wherein the electrochemical cell has a prismatic architecture geometry formed by a succession of patterns of electrochemical cores distributed over a current collector strip.

19. The method according to claim 5, further comprising manufacturing an elementary electrochemical cell with prismatic architecture geometry with production of an electrochemical core by Z folding.

20. The method according to claim 19, wherein the electrochemical cell is formed by a succession of patterns of electrochemical cores distributed over a current collector strip, and wherein the current collector strip is folded in a Z to form the electrochemical cell, the separation layer being disposed at each fold to form one or more gas circulation spaces.

21. The method according to claim 5, further comprising manufacturing an elementary electrochemical cell with prismatic architecture geometry with production of an electrochemical core by stacking.

22. An elementary gas-electrode electrochemical cell of metal-gas type, configured to be integrated in an electrochemical assembly module of an energy storage system, the elementary gas-electrode electrochemical cell being obtained by implementing the manufacturing method according to claim 1 and being of lithium-air, aluminium-air, or zinc-air type.

23. The cell according to claim 22, having a cylindrical or prismatic architecture geometry, comprising the electrochemical core.

24. The cell according to claim 23, comprising a housing, comprising a tube with a cylindrical or prismatic cross section, a bottom cover, and a top cover, each cover constituting a terminal connected to an electrical pole of the electrochemical core of the cell.

25. The cell according to claim 24, wherein the bottom and top covers comprise an opening for allowing the gas to circulate.

26. The cell according to claim 24, comprising means for separation between an internal part of the tube of the housing and the electrochemical core of the cell to form gas circulation spaces.

27. The cell according to claim 22, having a prismatic architecture geometry, comprising a stacked electrochemical core.

28. The cell according to claim 27, comprising a housing, comprising an insulating body and two conductive lateral covers.

29. The cell according to claim 28, wherein the insulating body comprises orifices or grilles on two opposite sides that enable a gas to pass.

* * * * *